United States Patent
Margrave et al.

(10) Patent No.: US 7,029,646 B2
(45) Date of Patent: Apr. 18, 2006

(54) METHOD FOR CUTTING SINGLE-WALL CARBON NANOTUBES THROUGH FLUORINATION

(75) Inventors: John L. Margrave, Bellaire, TX (US); Zhenning Gu, Houston, TX (US); Robert H. Hauge, Houston, TX (US); Richard E. Smalley, Houston, TX (US)

(73) Assignee: William Marsh Rice University, Houston, TX (US)

( * ) Notice: Subject to any disclaimer, the term of this patent is extended or adjusted under 35 U.S.C. 154(b) by 472 days.

(21) Appl. No.: 10/408,886

(22) Filed: Apr. 8, 2003

(65) Prior Publication Data

US 2004/0009114 A1 Jan. 15, 2004

Related U.S. Application Data

(60) Provisional application No. 60/370,753, filed on Apr. 8, 2002, provisional application No. 60/390,176, filed on Jun. 20, 2002.

(51) Int. Cl.
*D01F 9/12* (2006.01)

(52) U.S. Cl. .............................. 423/447.1; 423/447.7; 977/DIG. 1

(58) Field of Classification Search ............. 423/447.1, 423/447.6, 447.7; 977/DIG. 1
See application file for complete search history.

(56) References Cited

FOREIGN PATENT DOCUMENTS

| WO | WO 98/39250 | 9/1998 |
|---|---|---|
| WO | WO 00/17101 | 3/2000 |
| WO | WO 02/064868 | 8/2002 |
| WO | WO 02/064869 | 8/2002 |

OTHER PUBLICATIONS

Yakobson et al., "Fullerene Nanotubes: C1,000,000 and Beyond," American Scientist, vol. 85, pp. 324-337 (1997).
Dresselhaus et al., "Science of Fullereness and Carbon Nanotubes," Chapter 19, Academic Press, (1996).
Liu et al., "Fullerene Pipes," Science, vol. 280, pp. 1253-1256 (1998).
Maurin, et al., "Segmented and opened multi-walled carbon nanotubes," Carbon, vol. 39, pp. 1273-1287 (2001).
Shelimov et al., "Purification of single-wall carbon nanotubes by ultrasonically assisted filtration", Chem. Phys. Lett., vol. 282, pp. 429-434 (1998).

(Continued)

*Primary Examiner*—Stuart L. Hendrickson
*Assistant Examiner*—Rebecca M. Stadler
(74) *Attorney, Agent, or Firm*—Ross Spencer Garsson; Edward Mickelson; Winstead Sechrest & Minick P.C.

(57) ABSTRACT

A method for cutting single-wall carbon nanotubes involves partially fluorinating single-wall carbon nanotubes and pyrolyzing the partially fluorinated nanotubes in an inert atmosphere or vacuum up to about 1000° C. The nanotubes are optionally purified before cutting. The partial fluorination involves fluorinating the nanotubes to a carbon-fluorine stoichiometry of $CF_x$, where x is up to about 0.3. The invention also relates to the derivatization of fluorinated and cut single-wall carbon nanotubes. The single-wall carbon nanotubes can be cut to any length depending on the fluorination and pyrolysis conditions. Short nanotubes are useful in various applications, such as field emitters for flat panel displays and as "seeds" for further nanotube growth.

30 Claims, 9 Drawing Sheets

OTHER PUBLICATIONS

Rubio et al., "A mechanism for cutting carbon nanotubes with a scanning tunneling microscope," Eur. Phys. J. B., vol. 17, pp. 301-308 (2000).

Mickelson et al., "Fluorination of single-wall carbon nanotubes," Chem. Phys. Lett., vol. 296, pp. 188-194 (1998).

Kelly et al., "Insight into the mechanism of sidewall functionalization of single-walled nanotubes: an STM study," Chem. Phys. Lett., vol. 313, pp. 445-450 (1999).

Journet et al., "Large-scale production of single-walled carbon nanotubes by the electric-arc technique," Nature, vol. 388, pp. 756-758 (1997).

Nanse et al., "Fluorination of Carbon Blacks: an X-ray Photoelectron Spectroscopy Study: I. A Literature Review of XPS Studies of Fluorinated Carbons. XPS Investigation of Some Reference Compounds," Carbon, vol. 35, pp. 175-194 (1997).

Boul et al., "Reversible sidewall functionalization of buckytubes," Chem. Phys. Lett., 310, pp. 367-372 (1999).

Chiang et al., "Purification and Characterization of Single-Wall Carbon Nanotubes," J. Phys. Chem. B, pp. 1157-1161 (2001).

Chiang et al., "Purification and Characterization of Single-Wall Carbon Nanotubes (SWNTs) Obtained from the Gas-Phase Decomposition of CO (HiPco Process)," J. Phys. Chem. B, vol. 105, pp. 8297-8301 (2001).

Mickelson et al., "Solvation of Fluorinated Single-Wall Carbon Nanotubes in Alcohol Solvents," J. Phys. Chem. B, vol. 103, pp. 4318-4322 (1999).

Gu et al., "Cutting Single-Wall Carbon Nanotubes through Fluorination," Nano Lett., vol. 2, pp. 1009-1013 (2002).

Yudasaka et al., "Effect of an organic polymer in purification and cutting of single-wall carbon nanotubes," Appl. Phys. A, vol. 71, pp. 449-451 (2000).

METHOD FOR CUTTING SINGLE-WALL CARBON NANOTUBES THROUGH FLUORINATION

CROSS-REFERENCE TO RELATED APPLICATIONS

The present application claims priority to the following U.S. Provisional Patent Applications: Ser. No. 60/370,753, filed Apr. 8, 2002, and Ser. No. 60/390,176, filed Jun. 20, 2002, both of which are incorporated herein by reference.

This invention was made with support from the Robert A. Welch Foundation (Grant Nos. C-0109 and C-0689) and the Texas Higher Education Coordinating Board's Advanced Technology Program (Grant Nos. 003604-0026-2001 and 003604-0055-1999).

FIELD OF THE INVENTION

This invention relates generally to single-wall carbon nanotubes, and more particularly to a method for cutting single-wall carbon nanotubes through fluorination and pyrolysis.

BACKGROUND OF THE INVENTION

Single-wall carbon nanotubes (SWNT), commonly known as "buckytubes," have unique properties, including high strength, stiffness, thermal and electrical conductivity. SWNT are hollow, tubular fullerene molecules consisting essentially of $sp^2$-hybridized carbon atoms typically arranged in hexagons and pentagons. Single-wall carbon nanotubes typically have diameters in the range of about 0.5 nanometers (nm) and about 3.5 nm, and lengths usually greater than about 50 nm. Background information on single-wall carbon nanotubes can be found in B. I. Yakobson and R. E. Smalley, *American Scientist*, Vol. 85, July–August, 1997, pp. 324–337 and Dresselhaus, et al., *Science of Fullerenes and Carbon Nanotubes*, 1996, San Diego: Academic Press, Ch. 19.

Single-wall carbon nanotubes are generally made in high-temperature processes using a carbon source and a metallic catalyst, typically comprising Group VIb and/or Group VIIIb transition metals. Methods for synthesizing single-wall carbon nanotubes include DC arc processes; laser vaporization of graphite doped with transition metal atoms; high temperature, high pressure gas-phase syntheses involving a carbon-containing feedstock gas, such as carbon monoxide; and a volatile transition metal catalyst precursor, and chemical vapor deposition (CVD) processes in which single-wall carbon nanotubes are formed from a carbon-containing gas on nanometer-scale metal catalyst particles, which can be supported on a substrate or catalyst support.

All known methods of synthesizing single-carbon nanotubes also produce a distribution of reaction products, including, but not limited to, single-wall carbon nanotubes, amorphous carbon, metallic catalyst residues, and, in some cases, multi-wall carbon nanotubes. The distribution of reaction products will vary depending on the process and the operating conditions used in the process. In addition to the distribution of reaction products, the process type and operating conditions will also produce single-wall carbon nanotubes having a particular distribution of diameters and lengths. Generally, the lengths of as-produced single-wall carbon nanotubes are in excess of about 50 nm, and more typically, greater than about 100 nm. Commonly, single-wall carbon nanotubes have lengths in the range of about 1 and about 10 microns.

Short lengths of nanotubes are often useful in various applications, such as, in flat panel displays, in composites, and as "seeds" for further nanotube growth. These short lengths are not economically or conveniently obtained from known single-wall carbon nanotube production processes, since the as-synthesized nanotubes are usually much longer than desired, and, in many cases, very entangled or bundled. Attempts to cut or shorten single-wall carbon nanotubes are complicated by two major factors. First is the nanotubes' extreme lack of solubility in water and most common solvents. Second is the strong propensity of single-wall carbon nanotubes to "rope" together in bundles that are strongly held together by van der Waals forces. The roping phenomenon produces aggregates of single-wall carbon nanotubes arranged together in aligned bundles or "ropes". These aggregates are very cohesive, such that a pair of single-wall carbon nanotubes contacting one another along their lengths can have a tube-to-tube binding energy of up to about 500 eV/micron.

Methods for shortening or cutting single-wall carbon nanotubes have included chemical means, such as by oxidative acid treatment; physical methods, such as physical abrasion and sonication; and combinations thereof. One method for chemically "shortening" the single-wall carbon nanotubes is based on the oxidation of SWNT using a mixture of concentrated sulfuric and nitric acids. (See International Patent Publication WO 98/39250, "Carbon Fibers Formed from Single-Wall Carbon Nanotubes," published Sep. 11, 1998, and Liu et al., *Science* 280, (1998) p.1253, both of which are incorporated herein by reference.) Physical means can also be used to shorten or cut single-wall carbon nanotubes. Examples of physical means for cutting nanotubes include, but are not limited to, abrasion, such as described in G. Maurin, et al., "Segmented and opened multi-walled carbon nanotubes," *Carbon* 39 (2001), pp. 1273–1287, sonication, such as described in K. B. Shelimov, et al., "Purification of single-wall carbon nanotubes by ultrasonically assisted filtration," *Chem. Phys. Lett.*, 282 (1998) pp. 429–434, and, application of an electric voltage, such as described by A. Rubio, et al., "A mechanism for cutting carbon nanotubes with a scanning tunneling microscope," *Eur. Phys. J. B,* 17 (2000) pp. 301–308. Another means of cutting single-wall carbon nanotubes can include both chemical and physical means. An example of a combination of means for cutting single-wall carbon nanotubes, using sonication and homogenization of a mixture of single-wall carbon nanotubes and polymethylmethacrylate in a monochlorobenzene solution, is described in Yudasaka et al., *Appl. Phys. A* 71, (2000) pp. 449–451.

SUMMARY OF THE INVENTION

In one embodiment, the present invention relates to a method for cutting single-wall carbon nanotubes through fluorination and pyrolysis. In another embodiment, the carbon nanotubes can be cut by a method comprising the steps of purifying the single-wall carbon nanotubes, reacting the single-wall carbon nanotubes with a fluorinating agent to form partially fluorinated nanotubes to have a $CF_x$ stoichiometry, wherein x is less than about 0.3, and pyrolyzing the partially fluorinated nanotubes up to about 1000° C. in an inert atmosphere or vacuum environment. In another embodiment of the present invention, the single-wall carbon nanotubes have an average length of about 50 nm. In another embodiment, the invention the cut single-wall carbon nanotubes are derivatized with a functional group.

The fluorination step can be repeated any number of times with cut single-wall carbon nanotubes (cut-SWNT) to form shorter lengths of cut-SWNT. Another embodiment of the present invention relates to chemical modification and manipulation of cut-SWNT.

The method of this invention is particularly useful in the production of "cut" single-wall carbon nanotubes. Single-wall carbon nanotubes cut to specific lengths can be used in applications that include, but are not limited to (a) "seeds" for further growing nanotubes of specific types; (b) carriers for endohedral metals, inorganic salts or organic molecules; (c) carriers for chemotherapeutic and biochemical drugs for medical treatment of cancer; (d) short, stiff probes for atomic force microscope tips; (e) low-voltage electron emitters in flat-panel displays and television screens; (f) reinforcements for polymer composites, either as pristine nanotubes, as fluorinated nanotubes or as derivatized nanotubes having alkyl, amino, hydroxyl or other substituents; (g) a fluorine source for fluorotube/lithium electrochemical cells with higher voltage and longer life than the original fluorotubes, which are very tangled and heavily bundled; and (h) as lubricant additives for oils and greases.

DETAILED DESCRIPTION OF SPECIFIC EMBODIMENTS OF THE INVENTION

Figure 1:
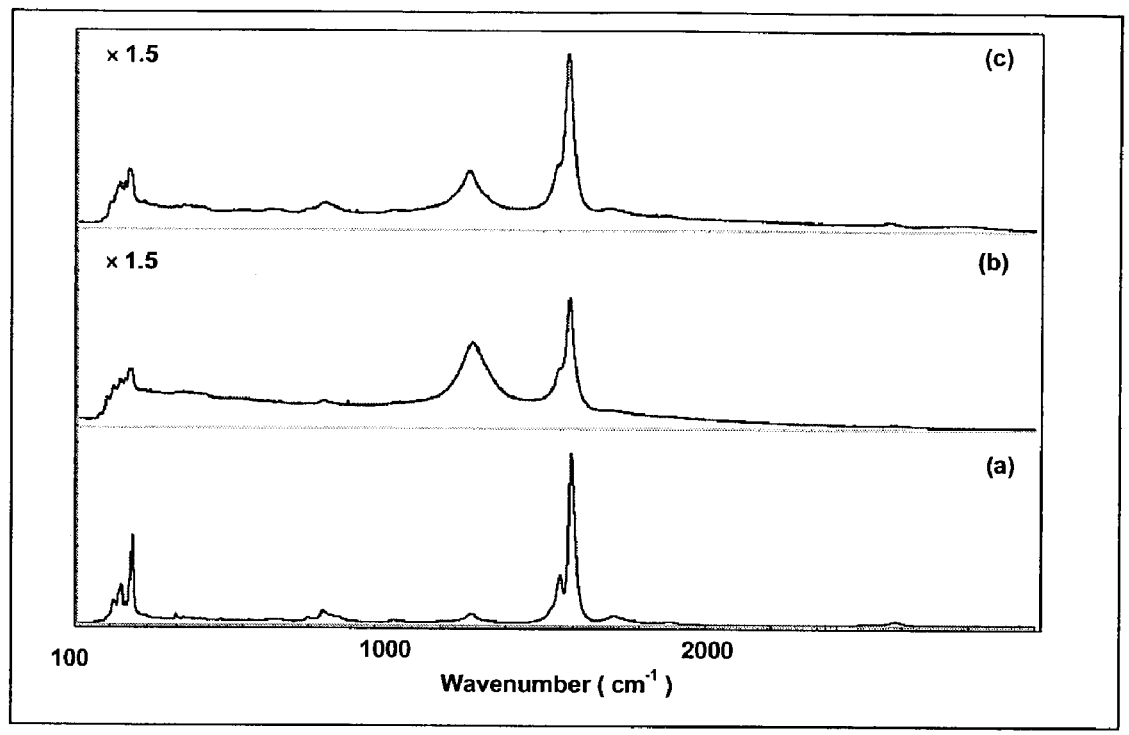
FIG. 1 shows comparative Raman spectra of (a) purified HIPCO SWNT, (b) partially fluorinated SWNT having a composition of about $CF_{0.2}$, and (c) cut SWNT.

In one embodiment, the present invention relates to a method for cutting single-wall carbon nanotubes through fluorination and pyrolysis. In another embodiment, the carbon nanotubes can be cut by a method comprising the steps of purifying the single-wall carbon nanotubes, reacting the single-wall carbon nanotubes with a fluorinating agent to form partially fluorinated nanotubes to have a $CF_x$ stoichiometry, wherein x is less than about 0.3, and pyrolyzing the partially fluorinated nanotubes up to about 1000° C. in an inert atmosphere or vacuum environment to cut the nanotubes. In another embodiment of the present invention, the single-wall carbon nanotubes have an average length of about 50 nm. In another embodiment, the invention the cut single-wall carbon nanotubes are derivatized with a functional group.

In yet another embodiment, the method for cutting single-wall carbon nanotubes comprises the steps of partially fluorinating the single-wall carbon nanotubes and pyrolyzing the partially fluorinated single-wall carbon nanotubes in nitrogen or an inert atmosphere to form cut-SWNT. The SWNT can be cut to any desired length by adjusting the fluorine-to-carbon ratio before pyrolysis or by repeating the fluorination and cutting steps. The cut-SWNT can also be modified and funtionalized. In another embodiment of the invention, the cut single-wall carbon nanotubes can be refluorinated and derivatized with functional groups, such as provided by, but not limited to, amines, alkyllithium compounds, Grignard reagents, alcohols and peroxides.

Single-wall carbon nanotubes, usable in the present invention, can be made by any known method including, but not limited to, arc discharge; laser ablation; flame synthesis; high-temperature, high-pressure, all-gas phase methods; chemical vapor deposition; and combinations thereof. For certain applications, purification may be preferred and can be done by any known means. Purification of the nanotube material can be done to remove amorphous carbon, metallic impurities and non-nanotube carbon. Suitable procedures for purification of carbon nanotubes are related in International Patent Publications "Process for Purifying Single-Wall Carbon Nanotubes and Compositions Thereof," WO 02/064,869 published Aug. 22, 2002, and "Gas Phase Process for Purifying Single-Wall Carbon Nanotubes and Compositions Thereof," WO 02/064,868 published Aug. 22, 2002, and included herein in their entirety by reference.

Prior to partial fluorination, the SWNT can be heated in an inert environment or ultra-high vacuum environment to remove adsorbed gases.

Methods for fluorinating the sidewalls and ends of single-wall carbon nanotubes have been related in International Patent WO 00/17107, published Mar. 30, 2000, and Mickelson et al., Chem. Phys. Lett. 296, (1998) pp. 188–194, both of which are incorporated herein by reference. These methods for fluorination result in fluorine being covalently bonded to the carbon atoms in the single-wall carbon nanotube structure while preserving the wall structure of the nanotubes.

Partial fluorination of SWNT involves reacting SWNT with a fluorinating agent, optionally diluted, and carefully controlling the reaction conditions, such as, for example, temperature, pressure, duration, etc., in order to control the carbon-fluorine stoichiometry of the nanotubes. In contrast to full fluorination, where the stoichiometry is $CF_{0.5}$, partial fluorination to produce cut nanotubes generally includes $CF_x$ stoichiometries where x is in the range of 0.01 to about 0.3, more generally in the range of about 0.1 and about 0.2. Generally, greater amounts of fluorine on the nanotubes result in shorter lengths of cut tubes. Conversely, smaller amounts of fluorine on the nanotubes result in longer lengths of cut tubes.

The fluorinating agent can be any species that can fluorinate single-wall carbon nanotubes. The fluorinating agent is preferably a gas and can include, but is not limited to, $F_2$, $ClF_3$, $BrF_3$, $IF_5$, HF, $XeF_2$, $XeF_4$, $XeF_6$, and combinations thereof. The fluorinating agent can optionally be diluted with a gaseous diluent, such as, but not limited to nitrogen and inert gases, such as argon, and combinations thereof. In another embodiment, hydrogen gas can also be mixed with the fluorinating agent. In an example of this embodiment, a suitable fluorinating gas mixture could comprise about 1 vol % $F_2$ and 1 vol % $H_2$ in nitrogen, an inert gas or combination thereof. The combination of $F_2$ and $H_2$ would generate HF, another preferred fluorinating agent, in situ.

The temperature, pressure, and duration of the partial fluorination reaction can all be varied such that a given combination suitably provides for partial fluorination of the single-wall carbon nanotubes. The temperature of fluorination can range generally from least about −80° C. to about 400° C., preferably about 50° C. to about 250° C., and more preferably about 50° C. to about 150° C. The partial pressure of the fluorinating agent in the fluorinations can range generally from about 1 mTorr to about 1000 Torr. The duration of fluorinating generally can range from about 1 second to several weeks, and more generally, from about 1 second to about 12 hours.

In one embodiment of the present invention, a gaseous flow reactor is used to prepare partially fluorinated SWNT. In this embodiment, a gaseous fluorinating agent is reacted with SWNT to partially fluorinate the nanotubes. The gaseous fluorinating agent can be diluted with nitrogen, an inert gas, or a combination thereof. The concentration of the active fluorinating agent in the gaseous stream can vary from about 0.01 vol % to about 100%.

In one embodiment of the present invention, the partial fluorination can be done in one or more discrete fluorination steps. In another embodiment of the present invention, the partial fluorination can be done in a progressive, continuous manner.

Although not meant to be held by theory, greater amounts of fluorination of the nanotubes appear to produce shorter lengths of cut nanotubes. Some fluorination conditions may result in excessive fluorination of the nanotubes for the desired length of cut-SWNT. In such cases, some of the fluorine from the nanotubes can be removed before pyrolysis. Fluorinated nanotubes can be defluorinated with reducing agents. Such reducing agents include, but are not limited to, hydrazine ($N_2H_4$), alkyl hydrazines, ammonia ($NH_3$), amines, lithium aluminum hydride ($LiAlH_4$), hydrogen ($H_2$), and combinations thereof.

The partially-fluorinated SWNT (p-F-SWNT) are pyrolyzed to produce cut-SWNT by heating the p-F-SWNT in a generally inert gaseous atmosphere, such as nitrogen or an inert gas, such as argon, or in a vacuum environment, such as an ultra-high vacuum (UHV). The pressure of the generally inert atmosphere can be any pressure that provides for the cutting of the p-F-SWNT during pyrolysis. The pressure can range from a vacuum (e.g. about $10^{-5}$ Torr) to pressures of about 10,000 Torr.

The pyrolysis temperature can be any temperature capable of effecting the cutting of the partially-fluorinated SWNT. Generally, the pyrolysis temperature can range between about 50° C. and about 1500° C., preferably between about 50° C. and about 1000° C. In one embodiment, the pyrolysis can be done at one temperature, such as, but not limited to, 600° C., 700° C., 800° C., 900° C., and 1000° C., and held for a time, such as, but not limited to, one to four hours. In another embodiment, pyrolysis can be as a series of discrete pyrolysis temperatures and times. In another embodiment, the temperature is ramped or increased slowly over time. By "slowly", it is meant a temperature ramp generally in the range of about 1° C./min and about 50° C./min. Preferably, the temperature is ramped in the range of about 5° C./min and about 25° C./min, and more preferably in the range of about 5° C./min and about 10° C./min. In another embodiment, a combination of temperature ramps and discrete temperatures are used in the pyrolysis.

Not meaning to be bound by theory, the fluorination appears to occur in bands around the circumference of the nanotubes and form band-like fluorinated areas. (See K. F. Kelly et al., Chem. Phys. Lett. 313 (1999) pp. 445–450.) Again not meaning to be bound by theory, it appears that the cutting of the nanotubes occurs at the fluorinated bands and fluorinated regions of the nanotubes. A low temperature heat treatment could facilitate rearrangement of the fluorine on the nanotube. Such a low temperature heat treatment could be done prior to pyrolysis of the partially-fluorinated carbon nanotubes or the partially-fluorinated carbon nanotubes in which some of the fluorine was removed by reaction with hydrazine or other molecule capable of removing fluorine from the nanotube. The temperature range for a typical low temperature heat treatment could range from about 30° C. to about 200° C. Typically, the heat treatment could have a duration from about 1 hour to about 24 hours.

Pyrolysis causes the evolution of fluorocarbon species from the nanotubes and the cutting of the nanotubes. The SWNT can be cut to any desired length. The lengths of cut-SWNT will be a distribution of lengths, with the average length depending on factors, such as, but not limited to, the amount of partial fluorination, the fluorinating agent, the original length of the nanotubes, the time and temperature of fluorination, and the time and temperature profile of pyrolysis.

After the partially-fluorinated nanotubes are cut by pyrolysis, some of the cut-SWNT can be in the form of short bundles or "ropes" of single-wall carbon nanotubes held together by van der Waals attractive forces.

In another embodiment, the cut-SWNT can be refluxed in an oxidizing acid (e.g., sulfuric or nitric acid). While not intending to be bound by theory, such treatment can functionalize the nanotubes with carboxylic acid groups and other oxygen-containing groups. Cut-SWNT, oxidized in this manner, can form solutions and/or extremely stable suspensions, such as in alcohols (e.g., ethanol).

In another embodiment, cut-SWNT can be refluorinated to form short F-SWNT that can be further cut into even shorter lengths of nanotubes. The shorter cut SWNT can form shorter ropes of SWNT similar to ropes of cut-SWNT. The short F-SWNT can be solubilized in alcohols (e.g., isopropanol), and can be further reacted with strong nucleophiles, including, but not limited to, amines, alkyllithiums, Grignard reagents, aluminum alkyls, boranes, and combinations thereof.

The cutting of SWNT though partial fluorination and subsequent pyrolysis, and further derivatization of cut-SWNT involves various interrelated parameters (e.g., quantity, purity, reaction time, etc.). The procedures for cutting and derivatization can be scaled up, and such scaled-up processes fall within the scope of the present invention.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

This example demonstrates the cutting of single-wall carbon nanotube by fluorination. HIPCO® single-wall carbon nanotubes were produced using an all-gas phase method involving the high-temperature, high-pressure, iron-catalyzed, disproportion of carbon monoxide. (HIPCO is a registered trademark of Carbon Nanotechnologies, Inc., Houston, Tex.) The average diameter of the nanotubes produced by this method is typically about 1.0 nm.

Before fluorination, the SWNT were purified to remove amorphous carbon and residual iron catalyst particles, most of which were encapsulated in carbon shells. The purified single-wall carbon nanotubes were then placed in a temperature-controlled furnace having a continuous helium purge.

The temperature of the furnace was controlled to 50±5° C. $F_2$ and helium were introduced into the furnace as a mixture of such that the concentration of $F_2$ was about 1 vol % in the mixture. The 1% $F_2$/He mixture flowed over the SWNT for about 2 hours at a controlled rate. Fluorine reacted with the SWNT to produce partially-fluorinated SWNT. The fluorination conditions were carefully controlled in order to fluorinate the nanotubes to a composition of about $CF_{0.2}$, which was confirmed by energy-dispersive X-ray spectroscopy (EDS or EDAX).

The partially-fluorinated SWNT were then pyrolyzed in argon by heating the partially-fluorinated SWNT at a rate of about 10° C./min. to about 1000° C. The pyrolysis was conducted in a thermogravimetric analysis (TGA) apparatus coupled to a Fourier transform infrared (FT-IR) spectrometer in order to identify and quantify species released at various times and temperatures during the pyrolysis.

The C—F bonding characteristics were investigated by Raman, using a 780.6-nm excitation laser, and attenuated total reflectance infrared (ATR-IR) spectroscopies. FIG. 1 shows Raman spectra of the SWNT through fluorination and pyrolysis. FIG. 1 trace (a) shows a typical Raman spectrum of purified HIPCO SWNT. The spectrum shows well-defined radial breathing modes (RBM) peaks in the 170–270 $cm^{-1}$ region, a strong, sharp tangential mode peak at about 1592 $cm^{-1}$, and a very low intensity "disorder" mode peak at about 1292 $cm^{-1}$. The spectrum is indicative of purified SWNT with very few sidewall defects. (Journet et al., *Nature* 388, 756 (1997)).

FIG. 1 trace (b) shows the Raman spectrum of F-SWNT. The "disorder" mode peak shows a distinctive increase in intensity, indicative of large amounts of $sp^3$-hybridized carbon atoms in the fluorinated nanotubes. Raman spectroscopy changes in the RBM and tangential mode regions indicate changes in bonding structure and symmetry of the fluorine to the carbon in the SWNT.

Figure 2:
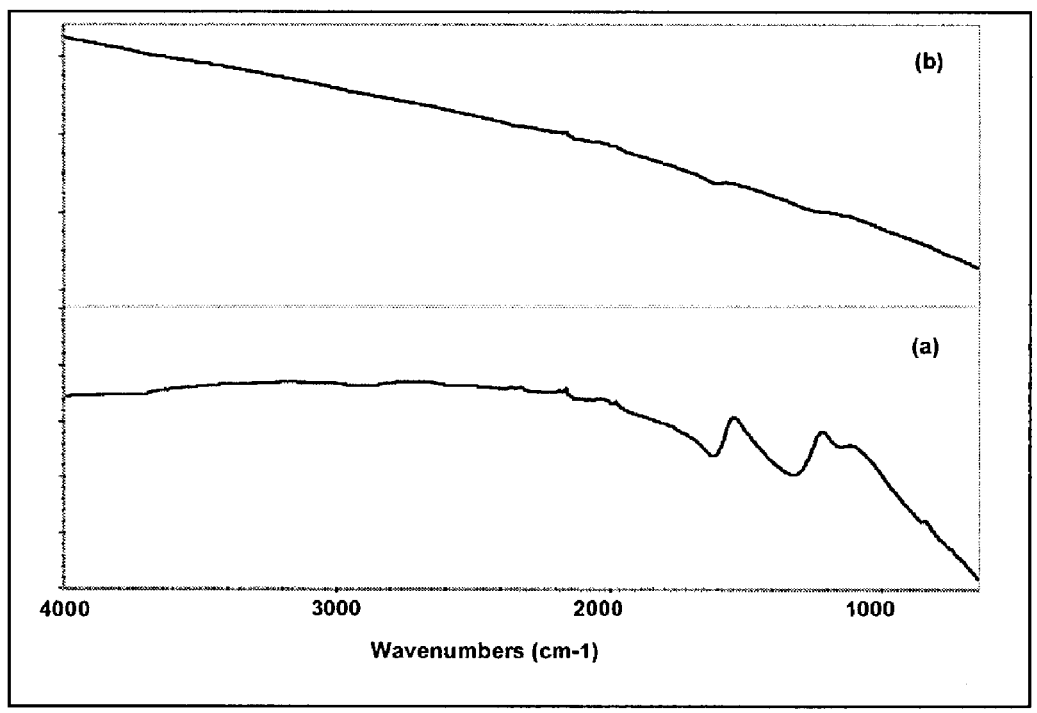
FIG. 2 shows ATR-IR spectra of (a) partially fluorinated SWNT having a composition of about $CF_{0.2}$, and (b) cut-SWNT.

An ATR-IR spectrum of F-SWNT is shown in FIG. 2 trace (a). The peaks at 1111 $cm^{-1}$ and 1221 $cm^{-1}$ are attributed to semicovalent and covalent C—F bonds, respectively, using fluorinated graphite as a point of comparison. (See Nakajima, *Fluorine-Carbon and Fluoride-Carbon Materials, Chemistry, and Physics*, Marcel Dekker (1995)). The peak at 1545 $cm^{-1}$ was attributed to a C=C double bond stretching mode in the carbon nanotube sidewall induced by nearby C—F bonds. (C=C double bond stretching modes are generally not present in pristine single-wall carbon nanotubes.) The low relative intensity of the C=C double bond absorption peak appears to indicate that the nanotubes contained unfluorinated areas in the sidewalls after fluorination.

Figure 3:
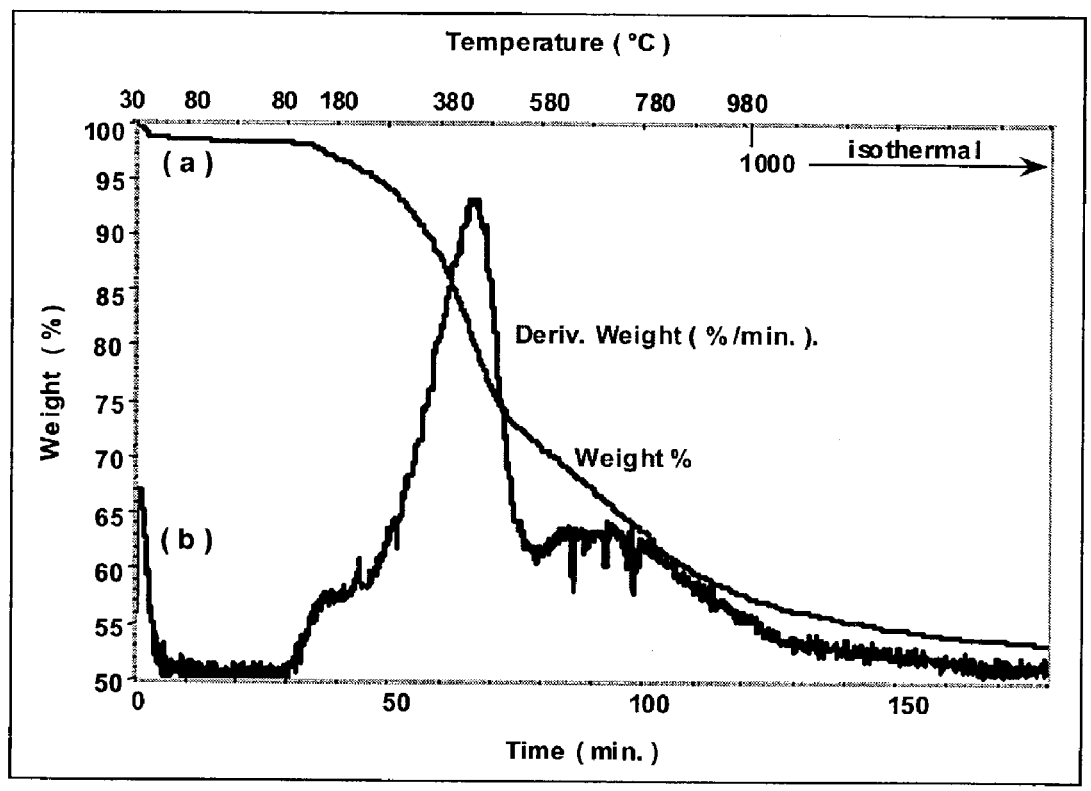
FIG. 3 shows a TGA of pyrolysis in argon of partially fluorinated SWNT having a composition of about $CF_{0.2}$. Trace (a) shows the weight loss (wt % of the total) as the temperature is ramped in time. Trace (b) shows the derivative of the weight loss (wt % loss/min.)

FIG. 3 trace (a) shows the TGA weight loss of F-SWNT during pyrolysis heating. The percent weight loss curve indicates an overall weight loss during pyrolysis of about 45%. FIG. 3 trace (b) gives the time derivative of the weight loss curve and shows major regions of weight loss. A first major weight loss occurred between about 300° C. and about 560° C.; and, a second major weight loss occurred between about 560° C. and about 1000° C. After the temperature was ramped up to about 1000° C., the temperature was maintained at 1000° C. for one hour. During the isothermal 1000° C. heating, the weight loss leveled out at about 45 wt %, indicating that partial fluorination and cutting by pyrolysis did not completely destroy the nanotubes.

Figure 4:
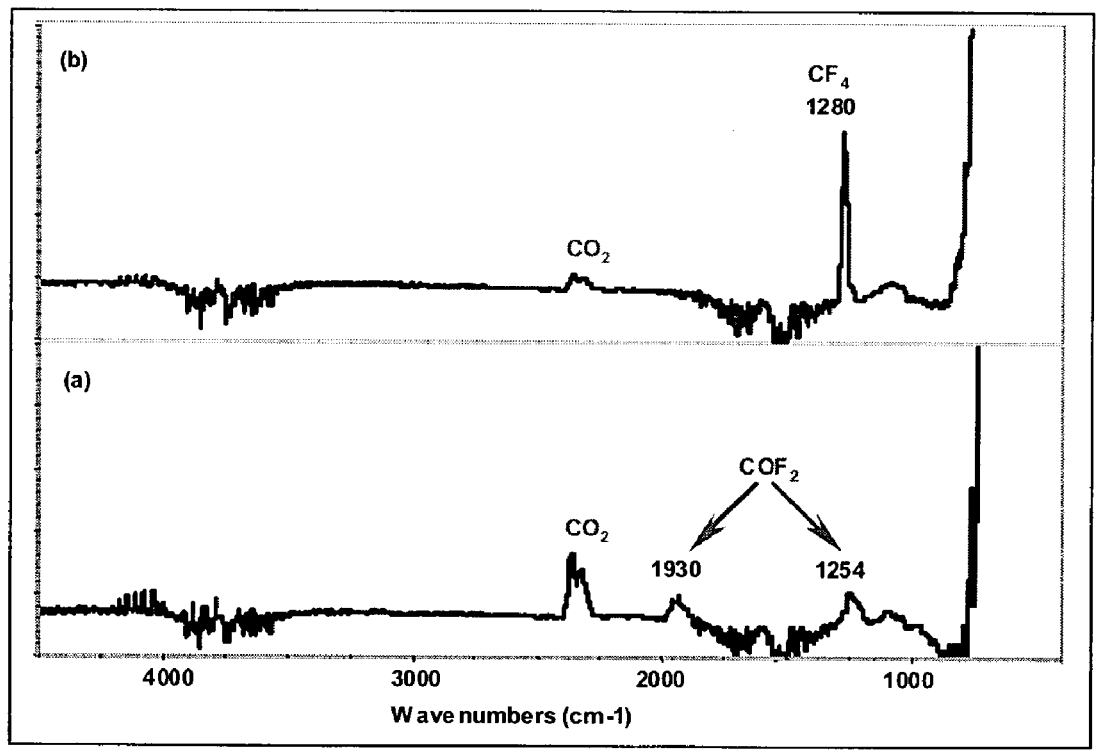
FIG. 4 shows IR spectra of the gaseous species released from F-SWNT during pyrolysis in argon. Spectrum (a) was obtained during t=52.37 to 76.44 minutes, corresponding to the temperature range of about 300 to 560° C. Spectrum (b) was obtained during t=76.54 to 113.11 minutes, corresponding to a temperature range of about 560 to 900° C.
Figure 5:
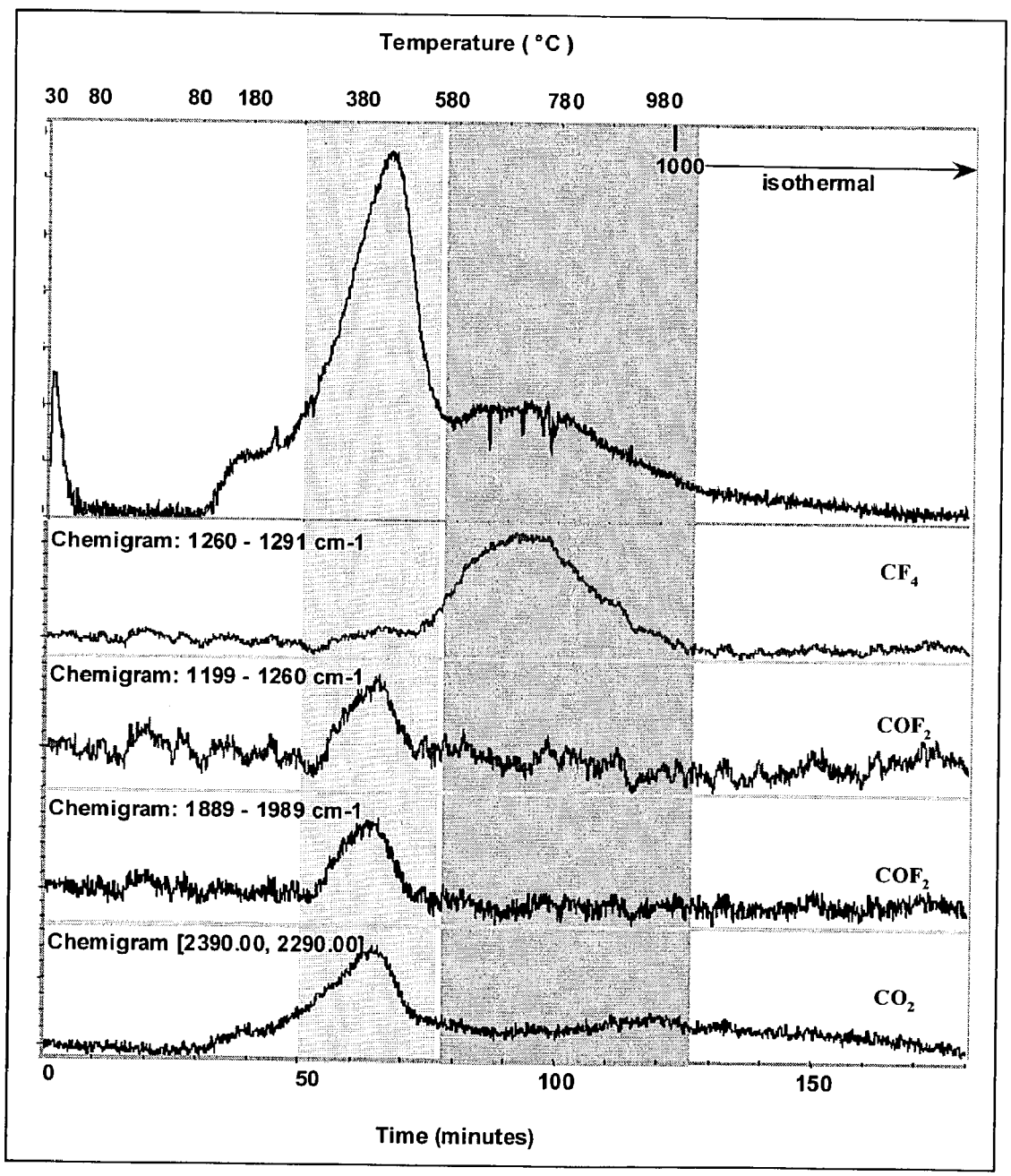
FIG. 5 shows a derivative curve of the TGA percentage weight loss curve for the pyrolysis of $CF_{0.2}$. The chemigrams show the temperature range of evolution for various gaseous species given off from F-S WNT during pyrolysis in argon.

FTIR was used to determine the composition and quantity of the evolved gaseous species during F-SWNT pyrolysis. The primary gaseous species that were identified included $CF_4$, $COF_2$ and $CO_2$, as shown in FIG. 4. (The origin of oxygen was not determined, but may be an impurity in the argon.) The chemigrams given in FIG. 5 show the relative concentration and time/temperature of evolution during pyrolysis for the primary gaseous species. $CO_2$ and $COF_2$ generally evolved in the temperature range of 300° C. and 560° C., while $CF_4$ evolved at about 560° C. and higher. Thus, there appears to be two main regions where fluorinated species evolve; first, $CO_2$ and $COF_2$ evolve between about 300° C. and about 560° C.; and, second, $CF_4$ evolves at temperatures of 560° C. and higher.

The TGA and IR spectra show that during the pyrolysis of F-SWNT, much of the fluorine and a certain amount of carbon are removed from the carbon nanotube. However, the loss of carbon did not cause a complete destruction and degradation of the SWNT. Examination of the carbon residue after pyrolysis revealed that about 55% of the mass remained as pristine nanotubes after pyrolysis up to 1000° C. Besides effecting the cutting of the nanotubes, pyrolysis removes much of the fluorine from the SWNT. An ATR-IR spectrum of cut-SWNT, given in FIG. 2 trace (b), shows that the C—F and the C—F-activated C=C peaks are absent after pyrolysis. EDAX elemental analysis of cut-SWNT also showed that, after pyrolysis, fluorine was present at less than 0.2 atom % in the cut-SWNT.

The Raman spectrum of cut-SWNT is shown in FIG. 1 trace (c). The relatively high intensity of the tangential mode compared with that of the disorder mode implies that the tubular SWNT structure was maintained during pyrolysis. The notable decrease in the relative intensity of the disorder mode reflects the variation in the relative amounts of $sp^3$ carbon and $sp^2$ carbon in the nanotube sample during pyrolysis.

Figure 6:
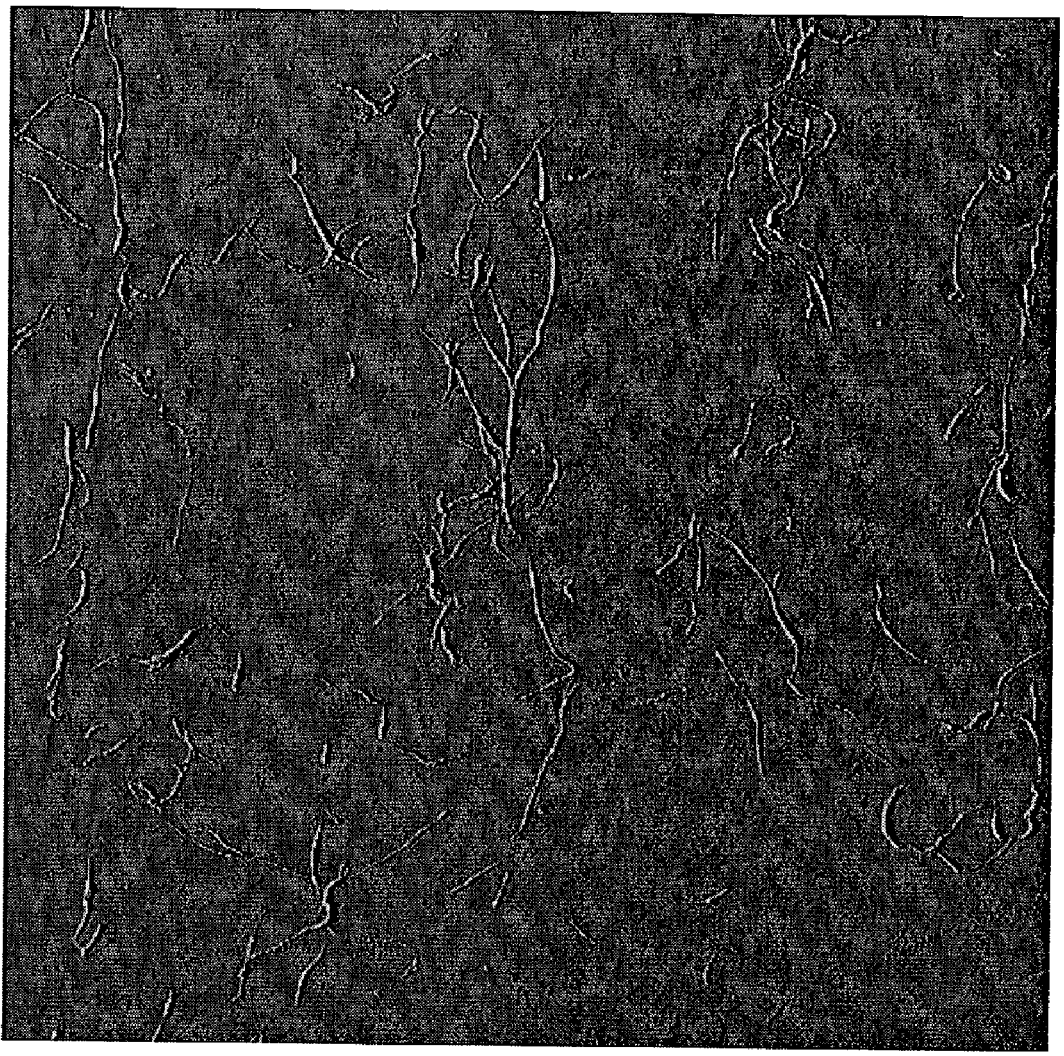
FIG. 6 shows an AFM image of F-SWNT.
Figure 7:
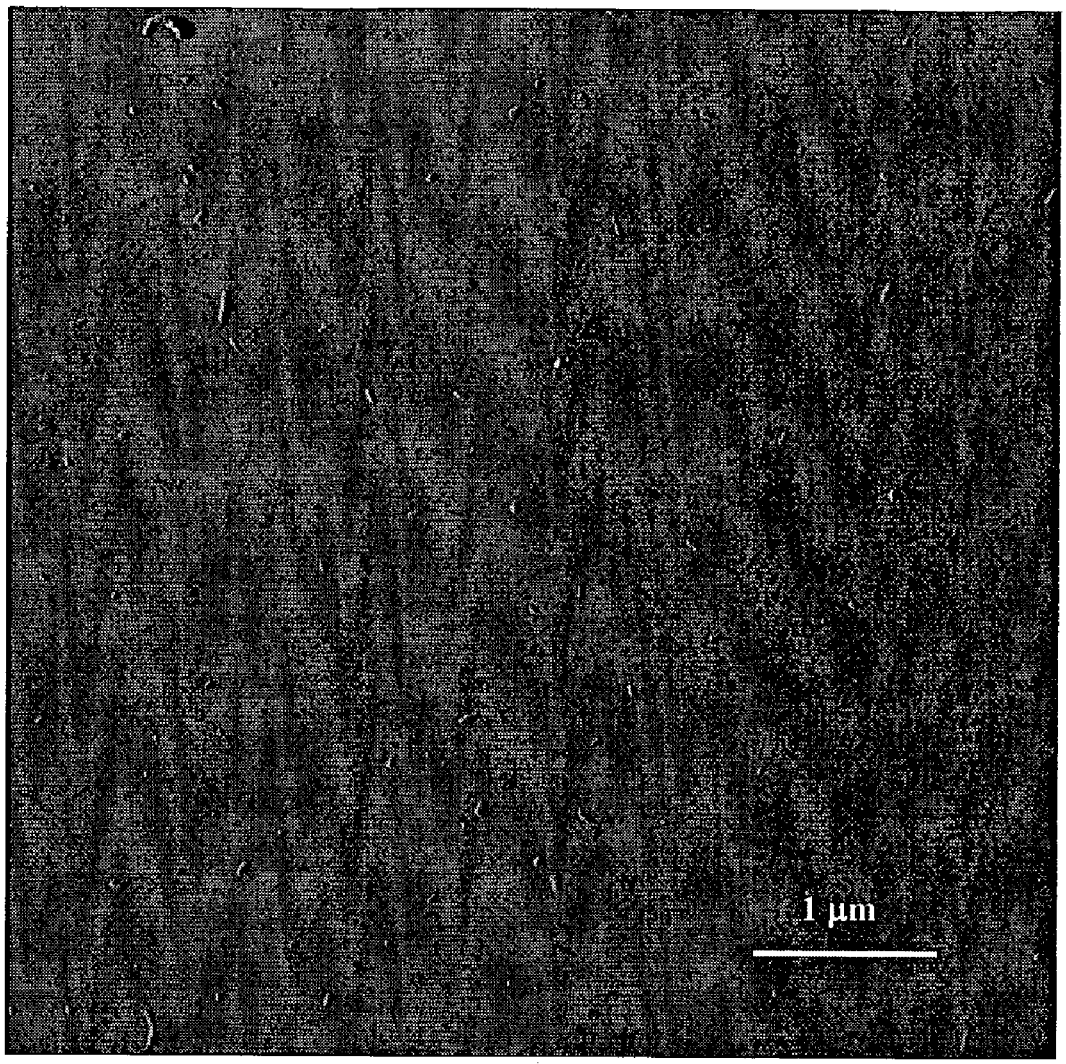
FIG. 7 shows an AFM image of cut-SWNT.
Figure 8:
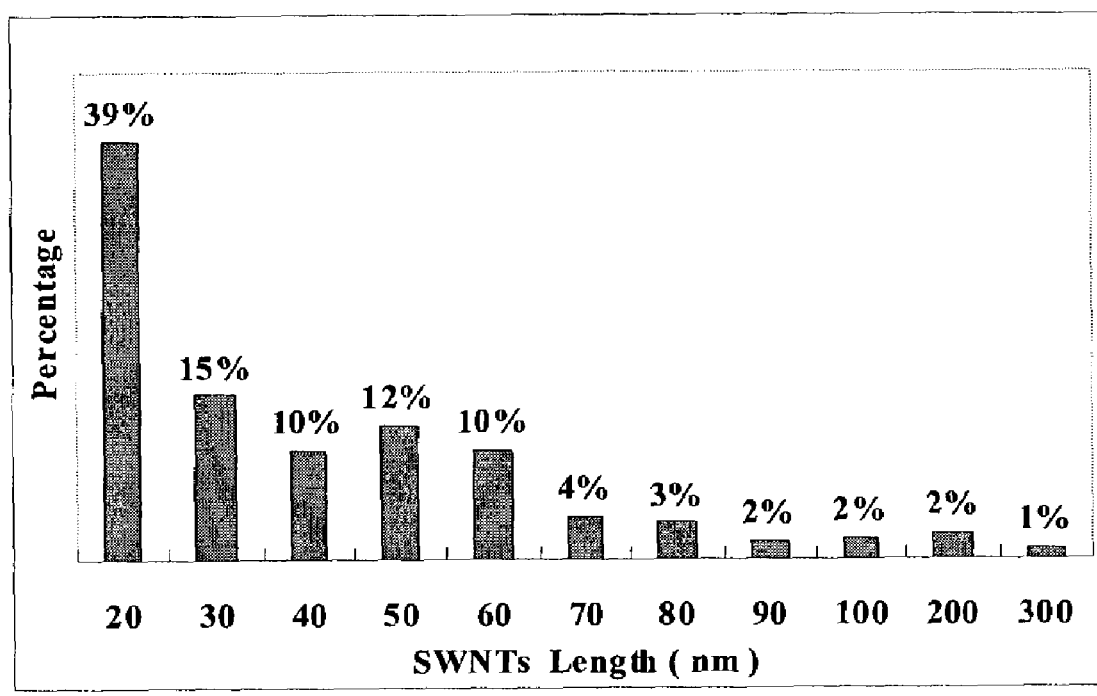
FIG. 8 shows a length distribution histogram for cut-SWNT.

The cut SWNT were also analyzed by atomic force microscopy (AFM). To prepare the cut-SWNT for AFM imaging, the nanotubes were dispersed with ultrasonic assistance in a 1 wt % aqueous sodium dodecyl sulfate (SDS) surfactant solution, and deposited on a silicon wafer. An AFM image of partially fluorinated SWNT is shown in FIG. 6. A typical AFM image of cut-SWNT after pyrolysis is shown in FIG. 7. A length distribution histogram of cut-SWNT is shown in FIG. 8. According to AFM measurements, the average length of the cut-SWNT bundles, made according to this example, is about 40 nm, with about 80% shorter than 60 nm. In contrast, most of the uncut, partially fluorinated SWNT have lengths longer than 1 μm, as shown in FIG. 6. AFM "height" analyses indicate that the average bundle size (i.e. the diameter of nanotube bundles) was about 8 nm for uncut partially-fluorinated SWNT versus about 6 nm for cut-SWNT.

EXAMPLE 2

This example demonstrates a series of experimental conditions that can be used to produce partially-fluorinated single-wall carbon nanotubes having different carbon-fluorine stoichiometries. Variables included fluorination temperatures in the range of about 50° C. and 150° C., fluorination times in the range of about 1 hour and 4 hours and concentration of fluorine ($F_2$) gas in the range of 0.2 vol % and 10 vol %. Different degrees of fluorination for single-wall carbon nanotubes were obtained from different experimental conditions. The degree of fluorination is expressed in terms of $CF_x$ stoichiometry, where x ranged from x=0.06 to x=0.3. The experimental conditions for fluorination and the degree of fluorination of the nanotubes are summarized in Table 1.

TABLE 1

| Reaction Conditions | | | |
| --- | --- | --- | --- |
| Fluorination Temperature (° C.) | Fluorination Duration (hours) | Concentration of $F_2$ in gas mixture (vol %) | Degree of Fluorination: $CF_x$ in SWNT (x) |
| 50 | 1 | 10 | 0.20 |
| 50 | 2 | 10 | 0.20 |
| 50 | 3 | 10 | 0.22 |
| 50 | 1 | 1 | 0.10 |
| 50 | 2 | 1 | 0.21 |
| 50 | 3 | 1 | 0.20 |
| 50 | 1 | 0.2 | 0.04 |
| 70 | 2 | 1 | 0.25 |
| 100 | 1 | 0.2 | 0.06 |
| 100 | 4 | 1 | 0.30 |
| 150 | 2 | 1 | 0.30 |

EXAMPLE 3

This example demonstrates defluorination of fluorinated SWNT to remove some fluorine from the nanotubes. HIPCO single-wall carbon nanotubes were fluorinated to carbon-fluorine stoichiometries of $CF_{0.25}$ and $CF_{0.5}$. The fluorinated nanotubes were defluorinated to produce partially fluorinated nanotubes having carbon-fluorine stoichiometries of about $CF_{0.05}$ (about $C_{20}F$) and about $CF_{0.017}$ (about $C_{60}F$), respectively.

EXAMPLE 4

Figure 9:
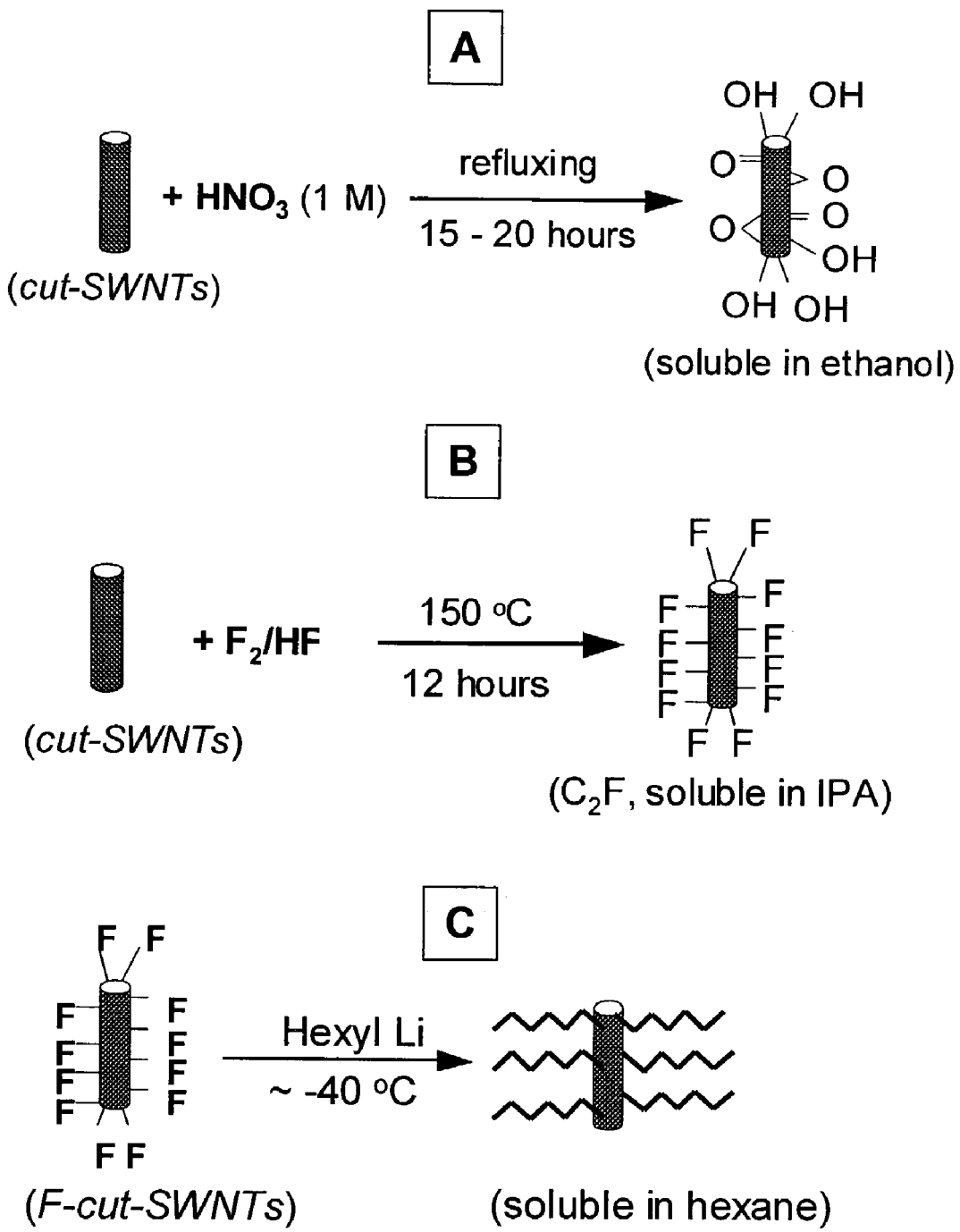
FIG. 9 shows functionalization reactions with cut-SWNT.

This example demonstrates methods for preparing functionalized cut-SWNT. FIG. 9 shows reactions of cut-SWNT. In the reaction "A", cut-SWNT was reacted with 1 M $HNO_3$ (aq) and refluxed at boiling for 15 to 20 hours to produce oxygen-functionalized SWNT, characterized by oxygen and hydroxyl groups on the SWNT, which was soluble in ethanol.

In reaction "B", cut-SWNT was reacted with a gaseous mixture comprising $F_2$ and HF at about 150° C. for about 12 hours to produce end- and sidewall-fluorinated cut-SWNT (F-cut-SWNT), which was soluble in isopropyl alcohol (IPA).

In reaction "C", F-cut-SWNT was further reacted with hexyl lithium at –40° C. In this reaction, the hexyl groups replaced the fluorine groups to produce hexyl-derivatized cut-SWNT, which were soluble in hexane.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A method of cutting single-wall carbon nanotubes comprising:
   (a) reacting a fluorinating agent with single-wall carbon nanotubes to form partially-fluorinated single-wall carbon nanotubes; and
   (b) pyrolyzing the partially-fluorinated single-wall carbon nanotubes to yield cut single-wall carbon nanotubes.

2. The method of claim 1 wherein the fluorinating agent is selected from the group consisting of $F_2$, $ClF_3$, $BrF_3$, $IF_5$, HF, $XeF_2$, $XeF_4$, $XeF_6$, and combinations thereof.

3. The method of claim 1 further comprising purifying the single-wall carbon nanotubes.

4. The method of claim 1, wherein the fluorinating agent is $F_2$.

5. The method of claim 1, wherein the fluorinating agent is HF.

6. The method of claim 1, wherein hydrogen is combined with the fluorinating agent.

7. The method of claim 1, wherein the fluorinating agent is diluted with a gas selected from the group consisting of nitrogen, inert gas, argon and combinations thereof.

8. The method of claim 1, wherein the fluorinating agent is present at a concentration in the range of about 0.001 vol % and 100 vol %.

9. The method of claim 1, wherein the fluorinating agent is present at a concentration in the range of about 0.02 vol % and about 10 vol %.

10. The method of claim 1, wherein the fluorinating is done at a temperature in a range of about –80° C. and about 400° C.

11. The method of claim 1, wherein the fluorinating is done at temperature in a range of about 50° C. and about 250° C.

12. The method of claim 1, wherein the fluorinating is done at a temperature in the range of about 50° C. and about 150° C.

13. The method of claim 1, wherein the partially-fluorinated single-wall carbon nanotubes have a $CF_x$ stoichiometry, wherein x is in the range of about 0.01 and about 0.3.

14. The method of claim 1, wherein the partially-fluorinated single-wall carbon nanotubes have a $CF_x$ stoichiometry, wherein x is in the range of about 0.1 and about 0.2.

15. The method of claim 1 further comprising removing a portion of the fluorine from the partially-fluorinated single-wall carbon nanotubes.

16. The method of claim 1 further comprising heating the partially-fluorinated single-wall carbon nanotubes in an inert atmosphere.

17. The method of claim 16, wherein the heating is done at a temperature in the range of about 30° C. and about 200° C.

18. The method of claim 16 wherein the heating is done for a time in the range of about 1 and about 24 hours.

19. The method of claim 16 wherein the heating is performed before the pyrolyzing.

20. The method of claim 1, wherein the pyrolyzing is conducted in a gaseous atmosphere selected from the group consisting of nitrogen, inert gas, argon and combinations thereof.

21. The method of claim 1, wherein the pyrolyzing is conducted in a vacuum environment.

22. The method of claim 1, wherein the pyrolyzing is done in a temperature range of about 50° C. and about 1500° C.

23. The method of claim 1, wherein the pyrolyzing is done in a temperature range of about 50° C. and about 1000° C.

24. The method of claim 1, wherein the cut single-wall carbon nanotubes comprise less than about 0.2 atom % fluorine.

25. The method of claim 1 further comprising derivatizing the cut single-wall carbon nanotubes with a functional group.

26. The method of claim 25, wherein the functional group is provided by a compound selected from the group consisting of amines, alkyllithiums, Grignard reagents, alcohols, peroxides and combinations thereof.

27. The method of claim 1 further comprising fluorinating the cut single-wall carbon nanotubes to generate fluorinated cut single-wall carbon nanotubes.

28. The method of claim 27 further comprising derivatizing the fluorinated cut single-wall carbon nanotubes with a functional group.

29. The method of claim 28, wherein the functional group is provided by a compound selected from the group consisting of amines, alkyllithiums, Grignard reagents, aluminum alkyls, boranes and combinations thereof.

30. The method of claim 1, wherein the fluorinating agent has a partial pressure in a range of about 1 mTorr and about 1000 Torr.

* * * * *